3,246,958
RENDERING APPARATUS
Gerald R. Bowes, Santa Clara, Calif., assignor to FMC Corporation, San Jose, Calif., a corporation of Delaware
Filed Sept. 12, 1963, Ser. No. 308,416
9 Claims. (Cl. 23—280)

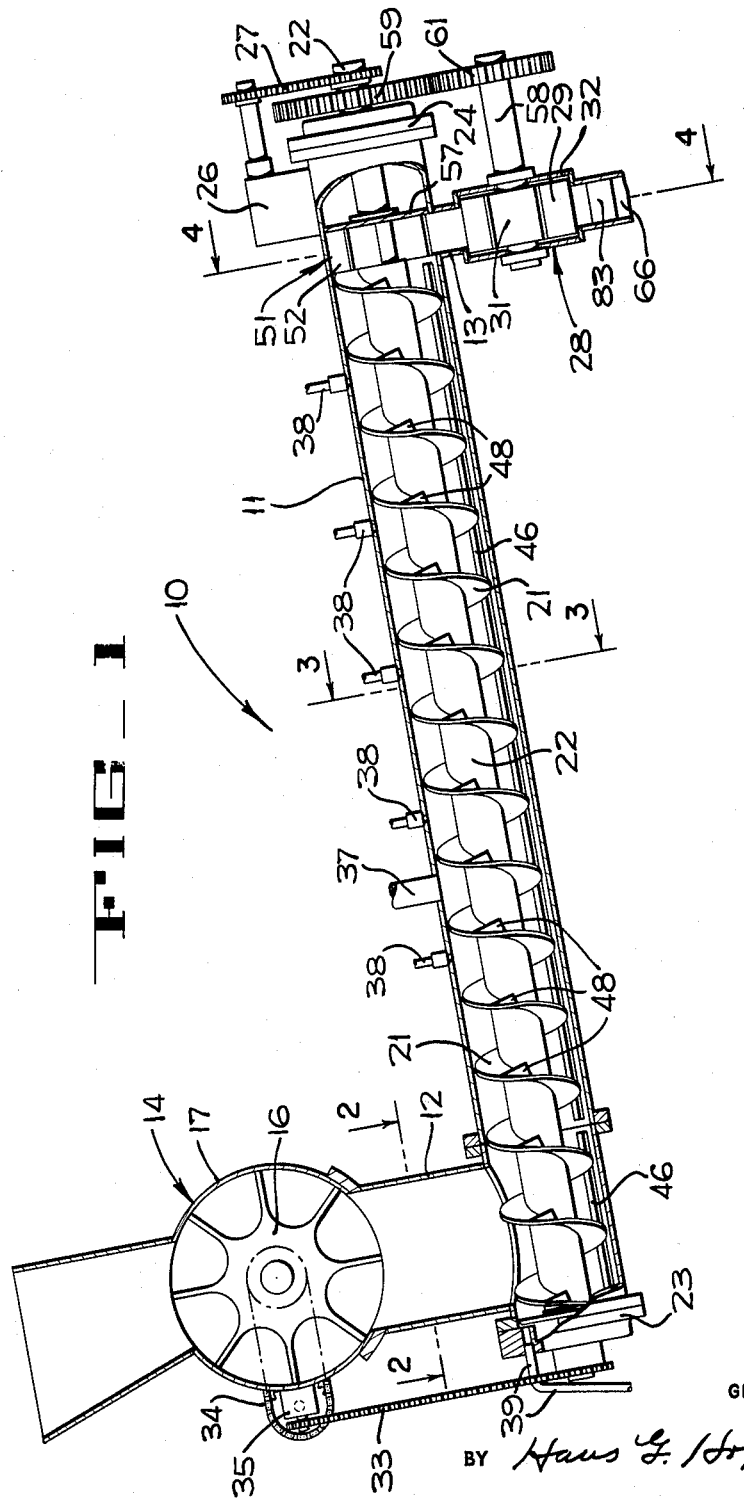

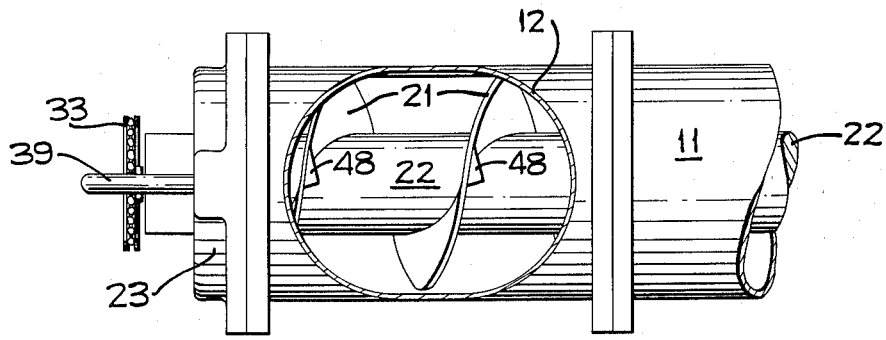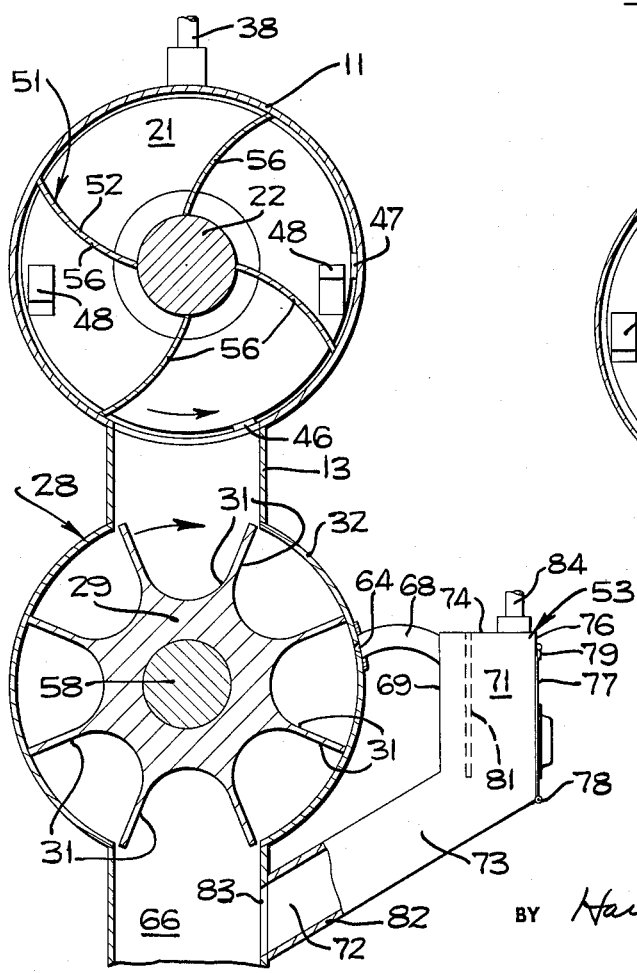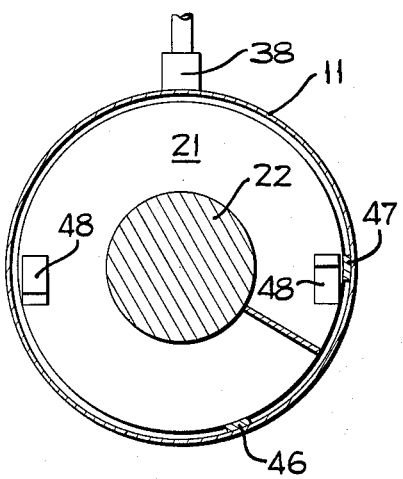

This invention pertains to rendering apparatus for recovering tallow and the like from fat-containing solids such as meat scraps, and more particularly relates to apparatus for handling the solids in a more efficient manner and for increasing the capacity of the rendering apparatus.

When rendering tallow and the like from fat-containing material with the type of apparatus disclosed in the United States patent application of Frank D. Hickey et al., Serial No. 211,761, which is assigned to the assignee of the present application, certain difficulties were encountered in attempting to increase the capacity of the machine to approximately double that of the original capacity. With this increased capacity it was first noted that material fitted into the apparatus through the feed valve would build up in the feed neck to such an extent that it would block the flow of fat extracting fluids, or stick-water, past the feed neck to its normal point of discharge from the rendering apparatus. Another problem encountered when attempting to increase the capacity of the rendering apparatus was that the material would tend to rotate with the screw conveyor which resulted in the forming of a rotating plug as well as causing stringy and fibrous material to wrap around the shaft of the screw conveyor. A further difficulty was that the greater capacity caused a greater depth of material in the apparatus resulting in insufficient exposure of the surfaces of the material to allow an effective liquid rinsing and draining of the product. It was also found that the increased capacity of the material being discharged was such that the pressure discharge valve would not reliably accommodate the material when gravity fed, and that the discharged material, which is sticky, would frequently plug the pressure equalizing vents of the discharge valve.

It is, therefore, one object of the present invention to provide a high capacity rendering apparatus.

Another object is to provide improved means for evenly distributing material into the processing chamber of a rendering apparatus.

Another object is to provide mechanism for improving the degree of agitation of the material being rendered.

Another object is to provide improved apparatus for controlling the flow of material being rendered through a rendering apparatus.

Another object is to provide an improved discharge mechanism for a rendering apparatus.

Another object is to provide improvements in a rendering apparatus for more positively controlling the flow of material being processed therethrough.

These and other objects and advantages of the present invention will become apparent from the following description and the accompanying drawings, in which:

FIGURE 1 is a schematic side elevation, with parts broken away, of the rendering apparatus of the present invention.

FIGURE 2 is an enlarged section taken along lines 2—2 of FIGURE 1 particularly illustrating the cross-sectional configuration of the elongated feed neck used on the rendering apparatus, the screw conveyor at the bottom of the neck being rotated approximately 90° from the position shown in FIGURE 1.

FIGURE 3 is an enlarged section taken along lines 3—3 of FIGURE 1 showing rifling strips and stirring paddles which cooperate to more positively control the flow of material through the rendering apparatus.

FIGURE 4 is an enlarged section taken along lines 4—4 of FIGURE 1 showing the improved discharge mechanism associated with the rendering apparatus.

The rendering apparatus 10 (FIG. 1) of the present invention comprises an inclined cylindrical pressure vessel which includes a housing 11 having, at one end, a feed neck 12 secured to and projecting upwardly from the lower end of the housing, and having at the other end a discharge neck 13 secured to and projecting downwardly from the upper end of the housing. A pressure feed valve 14 is secured to the upper end of the feed neck 12 and includes a continuously driven pocketed rotor 16 which cooperates with a valve housing 17 to direct chopped particles of fat-containing material into the housing with a minimum loss of pressure from the housing.

A helical screw conveyor 21 is secured to a shaft 22 that is journalled in end caps 23 and 24 which close the ends of the housing 11. The screw conveyor 21 is continuously driven in a counterclockwise direction (FIG. 4) by a motor 26 (FIG. 1) which is connected to the shaft 22 by a chain drive 27. The rotor 16 of the feed valve 14 is continuously driven from the shaft 22 by chain drives 33 and 34, and a right angle gear box 35. A discharge pressure valve 28 (FIGS. 1 and 4), which is similar to the feed valve 14, is connected to the lower end of the discharge neck 13 and includes a continuously driven rotor 29 which includes a plurality of spaced pockets 31 that cooperate with a valve housing 32 to discharge processed solids, or meal, from the rendering apparatus 10 without an appreciable loss of pressure from the housing 11.

Steam is introduced into the housing 11 through a conduit 37 at a pressure within the range of 50 to 120 p.s.i.g. to thereby raise the temperature of the interior of the rendering apparatus and the material therein to approximately 300–350° F. As the fat-containing material is being moved upwardly within the inclined housing 11 by the screw conveyor 21 from the feed valve 14 to discharge valve 28, the high pressure steam cooks the material and separates the material into a portion consisting of solid material, hereinafter referred to as meal, and a portion consisting of a mixture of liquid and fat. The meal is discharged from the apparatus 10 through the discharge valve 28, and the mixture of liquid and fat is dislodged and washed from the meal by water or stick-water which enters the housing 11 under high pressure from spray nozzles 38 and is sprayed against the meal as the meal moves upwardly toward the discharge valve 28. The mixture of liquid and fat is first collected in a pool at the lower end of the housing 11 and is then discharged from the apparatus 10 through a conduit 39. The discharged meal and mixture of liquid and fat are then processed in any suitable way such as by the method and apparatus disclosed in the above referred to Frank D. Hickey et al. application.

As above described, the rendering apparatus is quite similar to that disclosed in the above mentioned Hickey et al. application. The feed and discharge valves, briefly described above, are more specifically described in the United States Letters Patent to William de Back, Patent No. 2,638,137.

In order to increase the capacity of the above described type of rendering apparatus to more than twice that of the apparatus described in the aforementioned Hickey et al. application, it was recognized that better control of the conveyance of the solid material through the rendering apparatus 10 was necessary.

For preventing material fed into the apparatus 10 through the feed valve 14 from piling up in the neck 12 thereby blocking the flow of liquid to the conduit 39, it was found that the feed neck 12 must be elongated in a direction parallel to the longitudinal axis of the screw conveyor 21. It has been determined that the longitudinal dimension of the neck should be at least approximately one and three tenths times as great as the diameter of the cylindrical housing 11, as indicated in FIGURE 2, to accommodate the above mentioned increase in capacity.

It has also been determined that the larger quantity of material discharged into the cylindrical housing has a strong tendency to adhere to the screw conveyor 21 and to rotate with the conveyor as a plug of rotating material. To overcome this tendency, a pair of rifling strips 46 and 47 (FIGS. 3 and 4) are welded to the inner surface of the housing 11 and extend longitudinally of the housing for substantially the full length of the screw conveyor 21. The rifling strips 46 and 47 frictionally engage the solids being processed and prevent the solids from rotating with the screw conveyor. It will also be noted that, since the rifling strips prevent rotation of the solids with the screw conveyor, the solids are more rapidly moved away from the area below the elongated feed neck 12 thereby greatly eliminating the possibility of the material accumulating under the feed neck and raising to a height which would obstruct the flow of liquid out of the rendering apparatus 10.

When moving an increased quantity of material through the apparatus 10, it will be appreciated that the depth of the material will be greater than normal and that additional agitation of the material will be required. Accordingly, triangularly-shaped stirring paddles 48 (FIGS. 2 and 3) are welded at spaced intervals adjacent the periphery of the screw conveyor 21. Thus, when the screw rotates relative to the non-rotating material in the apparatus 10, the paddles 48 will stir the solids so that different surfaces will be exposed to the recirculating stickwater thereby improving the degree of fat extraction. It will be recognized that the paddles 48 will continuously disrupt the material, especially when they move upwardly past the rifling strips 46 and 47 to thoroughly agitate the material thereby effecting a more efficient liquid rinsing and draining of the product.

An improved discharge mechanism 51 has been provided in order to discharge the meal, which is quite sticky, from the upper end of the housing 11 with the smallest possible discharge valve 28 turning at the lowest possible speed. The discharge mechanism 51 (FIGS. 1 and 4) includes the discharge valve 28, a discharge paddle wheel 52 which rotates with the screw conveyor 21 and forces the meal into the discharge valve 28, and a venting mechanism 53.

The discharge paddle wheel 52 (FIGS. 1 and 4) includes a plurality of evenly spaced vanes 56 which are secured to a reduced diameter portion of the shaft 22 as by welding. The vanes 56 are curved away from the direction of rotation of the screw conveyor 21, which is counterclockwise as shown in FIG. 4. A rotating sealing disc 57 (FIG. 1) is welded to the edges of the vanes 56 furthest from the screw conveyor 21 to prevent meal from moving upwardly along the housing 11 past the vanes. Thus, it will be seen that the screw conveyor 21 moves the sticky meal between the vanes 56, and the vanes positively push the meal down the discharge neck 13 for reception in the pockets 31 of the discharge valve 28.

The discharge valve 28 includes the rotor 29 which is keyed on a shaft 58 that is parallel to the screw conveyor shaft 22 and is journalled in the housing 32. The rotor 29 is continuously driven in a direction opposite to that of the screw conveyor 21 by gears 59 and 61 which are keyed to the shafts 22 and 58, respectively. The gear ratio is such that the speed of the rotor 29 is approximately twice the speed of the screw conveyor 21.

An important feature of the invention is that the vanes 56 and pockets 31 are moving in the same direction as they pass the discharge neck 13 as clearly indicated by the arrows in FIGURE 4. Thus, the relative velocity between the vanes and the pockets is reduced to a minimum permitting more meal to be forced into each pocket 31 by the curved vanes 56, than was heretofore possible, during the time the pockets are under the discharge neck 13. Although it would be desirable to drive the rotor 29 at the same speed as the screw 21 for best results, the necessary increase in size of the rotor would make this slow rotor speed impractical.

It will be recognized that as the full pockets 31 of the discharge valve 28 rotate out of communication with the discharge neck 13, these pockets are under considerable steam pressure. In order to relieve this steam pressure so that the meal can subsequently be discharged from the valve 28 at substantially atmospheric pressure, a plurality of equalizing steam vents 64 (only one being shown in FIGURE 4) are provided in the peripheral wall of the discharge valve housing 32. The vents 64 are outwardly tapered and are of sufficient size to prevent plugging by meal particles which are drawn into the vents by the steam which is rapidly flowing therethrough.

Because the pockets 31 are fuller than would normally be expected in a rotary pressure valve, it is recognized that a small portion of the meal will be discharged through the vents 64. The venting mechanism 53 is provided in order to collect this portion of the meal and return it to a discharge passage 66 with the main portion of the meal which is subsequently discharged into the passage 66 from the valve 28.

The venting mechanism 53 comprises a curved tube 68 which is connected at one end to the discharge valve housing 32 over the vents 64. The other end of the tube is curved downwardly and is connected to the rear wall 69 of the housing 71. The housing includes the rear wall 69, side walls 72 and 73, a top wall 74, and a front wall 76. It will be understood that the width of the housing and tube is substantially the same as the width of the discharge valve 28. A door 77 is provided in the front wall 76 and is hinged at 78 and latched at 79. Steam and particles of meal enter the housing 71 through the tube 68 and are directed downwardly and away from the door 77 by a vertically extending baffle 81. The meal is propelled downwardly at high speed by the escaping steam and is guided by an inclined floor 82 of the housing 71 through a port 83 into the discharge passage 66. The steam escapes from the housing 71 through a conduit 84 connected to the top wall 74 and is directed to a condensing system (not shown). In the event meal sticks to the floor 82, the meal may be manually rodded into the discharge passage 66 after opening the door 77. The baffle 81 will prevent injury to the operator at this time by deflecting the steam away from the operator.

Although the operation of the rendering apparatus 10 was described in conjunction with the description of the parts, a brief summary of the operation will follow. In preparing the apparatus for operation, steam at between 50 and 120 p.s.i.g. is introduced into the apparatus 10 through the conduit 37, sprays of hot water at a pressure substantially higher than that of the steam pressure are directed into the apparatus through spray nozzles 38; and the feed valve 14, discharge valve 28, and screw conveyor 21 are continuously driven.

Material to be processed is directed into the apparatus 10 through the feed valve 14 and, because of the elongated feed neck 12 which permits even spreading of the material and the cooperating rifling strips 46 and 47 which prevents rotation of the material, is rapidly moved away from below the feed neck in an even layer without danger of rotating or building up to a height which would prevent the liquid from being discharged from the rendering apparatus. As the screw conveyor 21 moves the even layer of material upwardly within the inclined housing 11, the stirring paddles 48 agitate the material to continuously present new surfaces thereof to the rendering action of the steam and stickwater.

Upon reaching the upper end of the conveyor 21, the solid material or meal is moved between the vanes 56 of the paddle wheel 52 and is positively forced downwardly through the discharge neck 13 into the pockets 31 of the discharge valve 28. Since the valves 56 and pockets 31 are moving in the same direction as they move past the discharge neck 13, the relative motion between the vanes 56 and the pockets 31 is at a minimum and, accordingly, more time is permitted to fill the pockets with meal. The filled pockets then move in a clockwise direction (FIG. 4) until the pockets register with the equalizing steam vents 64 thereby reducing the pressure within the pockets to substantially atmospheric pressure. Any meal which is blown through the equalizing vents 64 is directed into the discharge passage 66 either by the direct effect of steam imparted velocity or by rodding the meal along the inclined floor 82 of the housing 71 after opening the door 77. It will be understood, however, that the steam imparted velocity normally discharges the particles into the passage 66. The bulk of the meal and the pockets 31 subsequently gravitate into the discharge passage upon continued rotation of the rotor 29 of the discharge valve 28.

From the foregoing description it will be apparent that the rendering apparatus of the present invention is more efficient than similar types of apparatus and is capable of handling double the capacity of material as compared to similar types of rendering apparatus. The rendering apparatus includes an elongated feed neck and cooperating rifling strips for controlling the movement of the material to be rendered in a uniform layer as it is moving through the rendering apparatus. The material is more effectively agitated to release the fats by the cooperation between the rifling strips and the stirring paddles. A more efficient and reliable discharge means is also included in the rendering apparatus.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. In a high capacity rendering apparatus of the type which includes a closed cylindrical housing, a driven rotary pressure-retaining feed valve at one end of said housing for directing material to be rendered into said housing, a driven rotary pressure-retaining discharge valve at the other end of said housing having an inlet opening for receiving the meal from said housing and a discharge opening for discharging meal, means for directing a rendering medium under pressure into said housing, and a driven screw conveyor in said housing for conveying material from said feed valve to said discharge valve; the improvement which comprises an elongated feed neck disposed between said rotary feed valve and said cylindrical housing and having an opening communicating with the interior of said housing that is approximately one and three tenths times as great in a direction parallel to the axis of said screw conveyor as the diameter of said housing for causing the material to spread in an even layer below said neck, a rifling strip welded to and projecting inwardly from the inner surface of said cylindrical housing for preventing the layer of material from rotating in said housing with said screw conveyor, a plurality of stirring paddles secured to the screw conveyor adjacent its periphery for stirring the material being rendered to expose different surfaces to the rendering medium, a discharge passage connected to the discharge opening of said discharge valve, and means connected to said discharge valve between said inlet opening and said discharge opening for venting steam and entrained particles of meal from said discharge valve and for directing the entrained particles of meal into said discharge passage for subsequent intermixing with the bulk of the discharge meal.

2. In a high capacity rendering apparatus of the type which includes a closed cylindrical housing, a driven rotary pressure-retaining feed valve at one end of said housing for directing material to be rendered into said housing, a driven rotary pressure-retaining discharge valve at the other end of said housing having an inlet opening for receiving meal from said housing and a discharge opening, means for directing a rendering medium under pressure into said housing, and a driven screw conveyor in said housing and having spaced propelling surfaces for conveying the material from said feed valve to said discharge valve; the improvement which comprises an elongated feed neck disposed between said rotary feed valve and said cylindrical housing and having an opening communicating with the interior of said housing that has a length measured in a direction parallel to the axis of said screw conveyor that is at least one and three tenths as great as the diameter of the cylindrical housing for causing the material to spread in an even layer below said neck, a rifling strip welded to and projecting inwardly from the inner surface of said cylindrical housing for preventing the layer of material from rotating with said screw conveyor, and a plurality of stirring paddles secured to the screw conveyor adjacent its periphery for stirring the material being rendered to expose different surfaces to the rendering machine, said stirring paddles being generally triangularly-shaped and each paddle being secured to one propelling surface of the screw conveyor and being spaced from the next adjacent surface of the screw conveyor to permit stringy material to move therepast.

3. In a high capacity rendering apparatus which includes a closed cylindrical housing, a driven rotary pressure feed valve at one end of said housing for directing material to be rendered into said housing, a driven rotary pressure discharge valve at the other end of said housing for discharging meal from said housing, means for directing a rendering medium under pressure into said housing, and a driven screw conveyor in said housing and having spaced propelling surfaces for conveying the material from said feed valve to said discharge valve; the improvement which comprises a rifling strip welded to and projecting inwardly from the inner surface of said cylindrical housing for preventing the material from moving in a circular path around the inner surface of said housing as it is advanced by said screw conveyor, and a plurality of generally triangularly-shaped stirring paddles secured to the screw conveyor adjacent its periphery and cooperating with said rifling strip for stirring the material being rendered to expose different surfaces to the rendering medium, said paddles each being secured to one propelling surface of the screw conveyor and being spaced from the next adjacent propelling surface of the screw conveyor to permit stringy material to move therepast.

4. In a high capacity rendering apparatus which includes a steam filled cylindrical pressure chamber having an inlet opening in its upper peripheral surface adjacent one end thereof and a discharge opening in its lower peripheral surface adjacent the other end thereof, a driven pressure-retaining feed valve at said one end and communicating with said inlet opening for directing material to be rendered into said housing, and a screw conveyor in said chamber driven in a predetermined direction for moving material to be rendered through said chamber; the improvement which comprises a discharge valve housing connected to the lower peripheral surface of and communicating with said pressure chamber through said discharge opening, a shaft journalled in said valve housing with its axis parallel to the axis of said screw conveyor, a pocketed rotor secured to said shaft and disposed within said valve housing, means for driving said rotor in a direction opposite to said predetermined direction, said housing having a venting port therein of sufficient size to permit steam under pressure and particles of material entrained therein to flow out of said venting port without plugging said port, a discharge conduit connected to said valve housing for receiving material discharged from said pockets, and means for directing the entrained particles of material into said discharge conduit for accumulation with the other material discharge from the pockets.

5. In a high capacity rendering apparatus which includes a closed cylindrical pressure chamber having an inlet opening in its upper peripheral surface adjacent one end thereof and a discharge opening in its lower peripheral surface adjacent the other end thereof, a driven pressure-retaining feed valve at said one end and communicating with said inlet opening for directing material to be rendered into said housing, and a screw conveyor in said chamber driven in a predetermined direction; the improvement which comprises a paddle wheel secured to one end of said screw conveyor and having a plurality of vanes projecting outwardly from the axis of said conveyor to a point adjacent the periphery of the cylindrical pressure chamber for sweeping past said opening, a discharge valve housing connected to the lower peripheral surface of and communicating with said pressure chamber through said discharge opening, a shaft journalled in said valve housing with its axis parallel to the axis of said screw conveyor, a pocketed rotor secured to said shaft and disposed within said valve housing, and means for driving said rotor in a direction opposite to said predetermined direction whereby the relative velocity between the vanes and the pockets of said rotor at their nearest point will be at a minimum assuring a more complete filling of the pockets with material being discharged from said pressure chamber.

6. In a high capacity rendering apparatus which includes a steam filled, closed cylindrical pressure chamber having an inlet opening in its upper peripheral surface adjacent one end thereof and a discharge opening in its lower peripheral surface adjacent the other end thereof, a driven pressure-retaining feed valve at said one end and communicating with said inlet opening for directing material to be rendered into said housing, and a screw conveyor in said chamber driven in a predetermined direction for moving material to be rendered through said chamber; the improvement which comprises a paddle wheel secured to one end of said screw conveyor and having a plurality of vanes projecting outwardly from the axis of said conveyor to a point adjacent the periphery of the cylindrical pressure chamber for sweeping past said opening, a discharge valve housing connected to the lower peripheral surface of and communicating with said pressure chamber through said opening, a shaft journalled in said valve housing with its axis parallel to the axis of said screw conveyor, a pocketed rotor secured to said shaft and disposed within said valve housing, means for driving said rotor in a direction opposite to said predetermined direction whereby the relative velocity between the vanes and the pockets of said rotor at their nearest points will be at a minimum assuring a more complete filling of the pockets with material being discharged from said pressure chamber, said housing having a venting port therein of sufficient size to permit steam under pressure and particles of material entrained therein to flow out of said venting port without plugging said port, a discharge conduit connected to said valve housing for receiving material discharged from said pockets, and means for directing the entrained particles of material into said discharge conduit for mixing with the other material discharged from the pockets.

7. In a high capacity rendering apparatus, a discharge mechanism comprising a discharge valve housing having an inlet opening, an outlet opening and an equalizing vent port disposed between said openings; a discharge conduit connected to said discharge opening; a rotor journalled in said housing and having pockets formed in its periphery which cooperate with said housing to provide sealed pressure chambers; means for directing solid material under high steam pressure through said inlet opening and into the pockets of said rotor; means for rotating said rotor whereby said pockets are moved into position to first receive material and steam under pressure from said inlet opening, are then moved past the equalizing vent port where steam and entrained particles of material escape through said vent port, and are finally moved to said discharge opening where the material in said pockets is discharged into said discharge conduit; and means connected between said equalizing vent port of said housing and said discharge conduit for directing the entrained particles of material into said discharge conduit for acceptance with the material discharged from the pockets.

8. In a high capacity rendering apparatus, a discharge mechanism comprising a discharge valve housing having an inlet opening, an outlet opening and an equalizing vent port disposed between said openings; a discharge conduit connected to said discharge opening; a rotor journalled in said housing and having pockets formed in its periphery which cooperate with said housing to provide sealed pressure chambers; means for directing said material under high steam pressure through said inlet opening and into the pockets of said rotor; means for rotating said rotor whereby said pockets are first moved into position to receive material and steam under pressure from said inlet opening, are then moved past the equalizing vent port where steam and entrained particles of material escape through said vent port, and are finally moved to said discharge opening where the material in said pockets are discharged into said discharge conduit; a curved tube connected at one end to said housing and communicating with said equalizing vent port to receive steam and particles of material discharged therefrom; an expansion chamber connected to the other end of said tube for receiving steam and the particles of material; a baffle in said expansion chamber for deflecting the material particles downwardly; an inclined floor of said expansion chamber communicating with said discharge conduit and arranged to deflect the particles of material into said conduit; and means for separately discharging the steam from said expansion chamber.

9. In a high capacity rendering apparatus which includes a closed cylindrical housing, a driven rotary pressure retaining feed valve at one end of said housing for directing material to be rendered into said housing, a driven rotary pressure discharge valve at the other end of said housing having an inlet opening for receiving meal from said housing and a discharge opening for discharging meal from said discharge valve, means for directing a rendering medium under pressure into said housing, and a driven screw conveyor in said housing for conveying the material from said feed valve to said discharge valve; the improvement which comprises an elongated feed neck disposed between said rotary feed valve and said cylindrical housing and being approximately one and three tenths as great measured in a direction parallel to the axis of said screw conveyor as the diameter of the cylindrical housing for causing the material to spread in an even layer below said neck, a plurality of rifling strips secured to and projecting inwardly from the inner surface of said cylindrical housing for preventing the layer of material from rotating with said screw conveyor, a plurality of stirring paddles secured to the screw conveyor adjacent its periphery for stirring the material being rendered to expose different surfaces to the rendering medium, a paddle wheel secured to said screw conveyor and aligned with the inlet opening of said discharge valve for forcing material into said discharge valve, a discharge passage connected to the discharge opening of said discharge valve, and means connected to said discharge valve between said inlet opening and said discharge opening for venting steam and entrained particles of meal from said discharge valve and for directing the entrained particles of meal into said discharge passage for intermixing with the bulk of the discharged meal.

References Cited by the Examiner

UNITED STATES PATENTS

| | | | |
|---|---|---|---|
| 1,735,392 | 11/1929 | Hiller | 23—290.5 |
| 1,766,033 | 6/1930 | Meakin | 23—280 |
| 1,961,420 | 6/1934 | Hildebrandt | 23—270 |

MORRIS O. WOLK, *Primary Examiner.*

JAMES H. TAYMAN, JR., *Examiner.*